United States Patent Office.

ENOCH WAITE, OF FRANKLIN, MASSACHUSETTS, ASSIGNOR OF ONE-HALF INTEREST TO STEPHEN M. WELD.

Letters Patent No. 107,642, dated September 20, 1870; reissue No. 4,173, dated November 1, 1870.

IMPROVEMENT IN FABRICS FOR THE MANUFACTURE OF SHOES, &c.

The Schedule referred to in these Letters Patent and making part of the same.

*To all persons to whom these presents may come:*

Be it known that I, ENOCH WAITE, of Franklin, in the county of Norfolk and State of Massachusetts, have made a new and useful invention of a new Fabric, and a Mode of Making such Fabric, and of articles made in whole or in part therefrom; and I do hereby declare the same to be fully described, as follows:

The said fabric is of comparatively short fibers of wool, or other material capable of being felted, made into sheets, in the manner and by the process hereinafter described, and one or more fibrous materials, among which may be mentioned buckskin or leather, reduced to fibers or very small pieces, such as will unite with or be united by the wool or other material capable of being felted, may be added, with the design of reducing the cost of the fabric, or of strengthening it, or of both reducing its cost and strengthening it.

In making the fabric, I usually take about sixty pounds of material capable of being felted, and about forty pounds of shreds of buckskin, or other fibrous material, and put into what is known as a rag-engine or paper-pulp grinder, and water is added, and, by the action of the engine or grinder, the whole mass is thoroughly mixed and reduced to a pulpy or semi-pulpy state, after which the pulp so formed is to be run through a paper-making machine, and is thereby made into sheets.

These sheets, while in a wet or damp state, are submitted to the action of a felting-machine, so as to felt together the fibers of the material which are provided by nature with hooks or projections similar to those on wool, the felting being effected in any usual manner, after which the fabric may be fulled in a fulling-machine in the manner in which woolen fabrics are commonly fulled, or in some cases the fulling may be performed upon the sheets without the intermediate process of felting.

Sometimes one or more thin layers of wool may be applied to either or each of the sides of each sheet before felting it, in which case the whole is united by felting or fulling, or both.

To form the fabric into a shoe-upper or other article, it is to be pressed into or on a mold suitably constructed for giving to the material the necessary shape, and heat is to be employed in or applied to the mold, so as to either wholly or partially dry the molded article while therein or thereon.

By such a mode of operation, shoe or boot-uppers, and various other articles, may be manufactured to great advantage.

Such shoe-uppers, after being made, may be soled in any well-known suitable manner.

Felt is commonly made from wool by first felting slivers or sheets of wool as they come from the carding-engine; and then sometimes by fulling after the felting operation, and as wool to be worked on a carding-engine must have a fiber of considerable length, wool of short staple, such as cloth-shearings, &c., has not hitherto been made into felt.

By this invention all short fibers of wool may be wrought into felt, thus reducing the cost far more than the quality of the goods is lessened.

Papers have been made by admixture of wool and wool-fabrics with other fibrous materials and water, and reduction of the mixture to a pulp in a rag-engine, the pulp then being made into paper on suitable machines.

But such wool-papers, though sometimes called felts, and used for roofing purposes, are not, strictly speaking, felts, as they have not been subjected, previous to this invention, to either a felting or a fulling operation, or both, after leaving the paper-making machinery.

I claim—

1. As a new manufacture, a fabric, formed by making, with water and fibers which will felt, a sheet in the manner in which sheets are formed from paper-pulp, then felting or fulling such sheet, or both felting and fulling it.

2. The process herein set forth of making the said new fabric.

3. A shoe-upper or other articles, as made of such new fabric in a wet state, and by means of a mold or former and heat and pressure, as set forth.

ENOCH WAITE.

Witnesses:

J. B. CROSBY,

FRANCIS GOULD.